United States Patent [19]
Shenfeld et al.

[11] 3,857,803
[45] Dec. 31, 1974

[54] LABELING ADHESIVE

[75] Inventors: Richard Stewart Shenfeld, Hoffman Estates; Orville E. Brown, Elk Grove Village, both of Ill.

[73] Assignee: Borden, Inc., Columbus, Ohio

[22] Filed: June 5, 1973

[21] Appl. No.: 367,197

[52] U.S. Cl. ............ 260/17.4 ST, 40/310, 106/213, 117/161 UZ
[51] Int. Cl. ........................................... C08b 25/02
[58] Field of Search ................ 260/17.4 ST, 62–71, 260/78.5 ST; 106/210, 213; 40/310

[56] References Cited
UNITED STATES PATENTS

| | | | |
|---|---|---|---|
| 2,282,364 | 5/1942 | Kunze | 106/210 |
| 2,654,170 | 10/1953 | Nestor | 40/310 |
| 3,368,987 | 2/1968 | Pollart | 260/17.4 |
| 3,515,630 | 2/1970 | Columbus et al. | 40/310 |
| R26,510 | 12/1968 | Mazzarella | 106/210 |

FOREIGN PATENTS OR APPLICATIONS

| | | | |
|---|---|---|---|
| 554,573 | 2/1951 | Canada | 260/17.4 |

OTHER PUBLICATIONS

Chem. Abst., Vol. 65, 1966, "Low Cost Starch Adhesives," Talbot.

*Primary Examiner*—Melvin Goldstein
*Assistant Examiner*—Edward Woodberry
*Attorney, Agent, or Firm*—George P. Maskas; George A. Kap

[57] ABSTRACT

This invention relates to an adhesive suitable for water-resistant fastening of labels to bottles intended to be immersed in ice water, said adhesive comprising at least 40 percent by weight water, from about 10 percent to about 40 percent starch, from about 5 percent to about 20 percent nitrogeneous substance selected from the group consisting of urea, dicyandiamide and their mixtures, and an ammoniated hydrolysis product of a styrene/maleic anhydride copolymer in amount corresponding to from about 0.6 to about 33 parts by weight of styrene/maleic anhydride copolymer for each 100 parts of combined weight of starch, urea and dicyandiamide, with sufficient ammonia to effect a pH in the adhesive in the range of about 7.5 to about 9.2.

6 Claims, No Drawings

LABELING ADHESIVE

BACKGROUND OF THE INVENTION

Bottled beverages such as soft drinks, beer and the like are often chilled by placing the bottles, prior to serving, in a tub or similar container, filled with ice and water. It is important that the labels which identify the contents should not peel off or become detached from the bottles during the submersion in the ice water.

A number of labeling adhesives based on casein have been disclosed as resistant to the action of ice water. In particular U.S. Pat. No. 2,276,148 discloses suitable casein formulations containing certain water-soluble gums. However, casein is sometimes in short supply because of its increasing use in foodstuffs and it has become of interest to use compositions based on starch.

Conventional "jelly gum" adhesives, based on starch, urea and sodium hydroxide, have been used as bottle-label adhesives. They can be made with viscosity and tack properties that are quite well suited for applicability on labeling machinery, but they are deficient in water resistance, the labels becoming detached after only 24 hours immersion in ice water. Manufacturers such as brewers now require labels to remain intact over a period of at least three days immersion. The test can be made more severe by using water at room temperature (about 20° to 30°C) instead of ice-water.

SUMMARY OF THE INVENTION

A means has now been found whereby a starch-based adhesive can be prepared which is capable of maintaining labels on bottles intact after exposure to room temperature water for at least three days.

Briefly stated, the present invention relates to an adhesive composition which comprises at least 40 percent by weight water, from about 10 percent to about 40 percent starch, from about 5 percent to about 20 percent nitrogeneous substance selected from the group consisting the urea, dicyandiamide and their mixtures, and an ammoniated hydrolysis product of a styrene/maleic anhydride copolymer in amount corresponding to from about 0.6 to about 33 parts by weight of styrene/maleic anhydride copolymer for each 100 parts of combined weight of starch, urea and dicyandiamide, with sufficient ammonia to effect a pH in the adhesive in the range of about 7.5 to about 9.2.

THE INVENTION IN LIGHT OF PRIOR ART

The herein discovered efficacy of hydrolyzed styrene/maleic anhydride in rendering conventional starch-urea adhesives more durable to submersion in water is surprising in view of prior art. Wildish (U.S. Pat. No. 2,624,715) and Wildish et al. (U.S. Pat. No. 2,667,462) used styrene/maleic anhydride to formulate adhesives which are water sensitive rather than water resistant. The water dispersible adhesives are used for readily rewettable "gumming stock" and contain amounts of sodium hydroxide which could cause failure of a label-on-glass bond under the herein described submersion test. In attempting to solve a quite different problem, these patents do not suggest a solution to the instant one.

U.S. Pat. No. 3,133,890 discloses compositions comprising the copolymer of polyvinylmethyl ether and maleic anhydride with starch and/or polyvinyl alcohol. Inasmuch as this patent seeks water resistant paper adhesives it was considered pertinent to test whether the PVM/MA polymer could serve in the place of the styrene/MA copolymer of this invention. The results, as described in Example 7 below, were negative.

U.S. Pat. No. 3,127,362 is directed to esterification of maleic anhydride copolymers with starch in the presence of large quantities of alkali metal hydroxide and only small amounts of water. The esterification products are stated to have value as paper sizing, pigmented coatings and beater additives, but their aqueous dispersions would not be effective as water resistant glues in the sense of the instant invention because of their high concentration of fixed alkali.

DETAILED DESCRIPTION OF THE INVENTION

The composition of the instant invention is made by a procedure which comprises the addition of a hydrolyzed styrene/maleic anhydride copolymer, in the presence of aqueous ammonia, to a conventional starch paste containing more urea and/or dicyandiamide. Various alternative procedures can be used to bring the components together. Preferably the starch is first dispersed by mixing in water at room temperature and after augmentation with the urea and/or dicyandiamide, the mixture is heated with stirring to about 85°C for about fifteen minutes, then cooled to about 60°–65°C. Sufficient ammonia is then dded to bring the pH to a value in the range of about 7.5 to about 9.2.

In a separate tank, a styrene/maleic anhydride copolymer, or a corresponding styrene/maleic acid copolymer, or an ammonium salt thereof, is added to water at about 50°–60°C and stirred with addition of sufficient ammonia to bring the pH to a value in the range of about 7.5 to about 9.2. When this mixture has become uniform, it is added to the augmented starch paste at about 60°–65°C and the paste is stirred until uniform.

At any stage during or after the pasting or mixing, conventional defoamers can be added as is customary to avoid formation of foam. Conventional preservatives such as phenol and various commercial phenol derivatives can also be added, as well as colorants which are customarily used in the preparation of label adhesives.

The styrene/maleic anhydride copolymer used in this invention is the usual copolymer having substantially 1:1 molar ratio of styrene and maleic anhydride. Such copolymers can be prepared, for example, by reaction in a medium which is a solvent for the monomers but a non-solvent for the copolymer, as disclosed in U.S. Pat. No. 2,047,398. The copolymer thus prepared can be converted to the corresponding maleic acid copolymer and used directly as an aqueous solution by a method such as disclosed in U.S. Pat. No. 2,565,147. Such solution of styrene/maleic acid can be converted to a solution of the ammonium salt by the addition of ammonia thereto. Or, alternatively, a commercially available solid ammonium salt of such a copolymer can be dissolved in water. The preferred method of preparing the ammoniated hydrolysis product is to add a styrene/maleic anhydride copolymer to water containing sufficient ammonia to bring the pH to a value in the range of about 7.5 to about 9.2, stirring at about 50°–60°C for about fifteen minutes. The resulting ammoniated hydrolysis product is devoid of amide groups.

Various grades of styrene/maleic anhydride copolymers are commercially available corresponding to a range of molecular weight. Types of these can be chosen singly or in combination for use in the formulations of the instant invention. This choice of molecular weights provides one factor which can be used to tailor-make the viscosity of the resultant adhesive to meet the specific requirements of the particular machinery used for applying labels to bottles. Styrene/maleic anhydride grades having average molecular weight in the ranges of about 10,000 to 50,000 are particularly useful. Corresponding copolymers of styrene with maleic acid or ammonium maleate can also be used.

The starch used in the composition of this invention can be any of the known starch types including corn, waxy maize, potato, sago, wheat, rice, sweet potato, arrowroot or tapioca starches. In general, "unconverted" starches are preferred to "modified" starches and thick-bodied starches are preferred to thin-bodied starches. The starch to be pasted in the method of this invention can be in the form of agglomerates of granules, such as in the so-called Pearl starches, or the starch can be powdered either by grinding or by direct disintegration during flash-drying.

The preferred starch is corn starch or waxy maize. Combinations of various starches can be used to adjust viscosity and tack in ways which are familiar to those skilled in the art of starch dispersions.

The use of urea and dicyandiamide respectively to modify and control the viscosity of starches is well known, as disclosed exemplarily in U.S. Pat. No. 2,282,364 and Canadian Patent 452,626. However, without the presence also of an ammoniated hydrolysis product of styrene/maleic anhyride, as in the present invention, the desired durability of paper-to-glass bond to submersion in water is not attained.

For the purpose of hydrolyzing styrene/maleic anhydride and for the purpose of controlling pH, it is preferred to use ammonia (ammonium hydroxide) or equivalent volatile base. While some of the advantages of the present invention can be obtained even if the composition includes small amounts of fixed alkali, such as sodium, potassium or calcium hydroxide, it is preferred that such substances be substantially absent in order to attain the highest level of water resistance. Thus, it is undesirable to use sodium hydroxide, as in the conventional preparation of starch pastes, for adjustment of rheological properties like viscosity and tack.

Adjustment of the viscosity of the adhesive can be accomplished by varying the type of starch according to known art, and/or by varying the molecular weight of the styrene/maleic anhydride component and/or by varying the proportions of all the components within the ranges noted. Viscosity can also be adjusted by varying the amount of water in the formulations. Using any or all of these procedures, the adhesive viscosity can be varied over a range of from about 7,000 to 300,000 centipoises, in particular from about 15,000 to about 75,000 centipoises. With modern labeling apparatus of the type in which the adhesive is pumped to the glue pot, viscosities in the lower part of this range are required.

The characteristic water resistance of the glass-to-paper bonds formed in using the adhesive of this invention becomes stronger as water and ammonia of the composition evaporate. Heat is not necessary to accelerate this "curing" process, ordinary air-drying during conventional storage of labeled bottles being sufficient, particularly since in conventional practice the labeled bottles are not submerged in water until at least several days after the labels have been attached. In the experience of the Applicants, a major portion of the water-resistance is achieved after only one day's storage at ambient temperatures; however most testing of adhive efficacy has been carried out under the more realistic conditions of at least three days room temperature "curing".

Although Applicants do not wish to be bound by theoretical considerations, it is quite likely that on loss of ammonia, acid carboxyl groups in the styrene/maleic polymer become more firmly attached to the respective surfaces of glass and paper (cellulose), and being also closely associated with or entwined among the starch and other molecules of the composition, form a dried structure which is extremely difficult to reverse and dislodge on subsequent submersion in water.

As to proportions, water is the major component of the adhesive composition of this invention, amounting to at least 40 percent of the adhesive, preferably at least 50 percent. The starch component, on a dry solids basis, can be used in amount from about 10 percent to about 40 percent by weight of the adhesive, preferably from about 20 percent to about 30 percent. Urea and/or dicyandiamide can be used in amount totalling from about 5 percent to about 20 percent by weight of the adhesive, preferably from about 8 percent to about 12 percent. The styrene/maleic anhydride component can be used in amount of from about 0.6 to about 33 percent based on the total combined weight of dry starch, urea and dicyandiamide, from about 10 percent to about 20 percent being preferred. The ammonia used is sufficient to reach a pH in the adhesive in the range of about 7.5 to about 9.2. Thus, when a styrene/maleic anhydride copolymer itself is used directly in the preparation of the adhesive, the amount of ammonia used corresponds to from about 1 percent to about 1.5 percent of 26° Baume aqueous solution of ammonia, based on weight of adhesive.

The adhesives of this invention can be employed with a wide variety of label types, being particularly suitable for labels comprising paper as the main substrate. Such paper can be prepared by any conventional paper process utilizing the conventional paper fibers and conventional sizing agents. The "front" label surface, reverse from the "back" surface to be glued to the glass vessel, can be provided with any kind of suitable message or design, applied by conventional means such as printing with suitable inks either directly on the paper itself or on a layer of fiber or foil laminated thereon, exemplarily aluminum foil. The printed side of the label can be protected by a coating of lacquer.

The invention will be further illustrated by the following examples, proportions here and elsewhere herein being expressed as parts by weight except where specifically stated to the contrary.

EXAMPLE 1

A solution was prepared containing 10.0 parts by weight of urea and 1.8 parts of a 29.4 percent aqueous ammonia solution (26° Be) in 67.8 parts of water. 25.0 parts of waxy corn starch were then dispersed in the solution and a paste was made by heating this dispersion to 85°C for a period of fifteen minutes. The paste was allowed to cool to 65°C and there was then added an ammoniacal solution (pH 8.7) containing 24.87 parts water and 3.90 parts of a styrene/maleic anhydride copolymer having average molecular weight equal to 20,000. The mixture was stirred until homogeneous. There were then added 0.20 parts of a conventional defoamer and 0.20 parts of a phenolic preservative available commercially as Dowicide A. The resultant product had pH equal to 8.8 and its viscosity was 65,000 cps as measured at 25°C on an HAF Brookfield viscometer with Spindle No. 3 at 1 rpm speed.

A five gallon sample of the adhesive prepared as above was submitted to a test on a Biner Ellison bottle-labeling machine. The product had the requisite high tack for efficient labeling and exhibited clean machining during the entire test which continued through an eight-hour shift. Bottles from this test were stored at room temperature and three days later they were tested for resistance to submersion in water at room temperature. The labels were found to have at least three days' resistance to this submersion, the test being terminated after three days. The bottles were in close contact with each other during this test and although they were moved around at frequent intervals the labels showed no tendency to loosen.

In a second test made at the bottling establishment of a brewery, an adhesive made in the above manner showed desirable good quick tack in application of the labels and all the bottles of the test passed on the brewery's four day water immersion test.

EXAMPLE 2

An adhesive which is not an example of the instant invention but which is representative of prior art bottle labeling adhesives based on starch and urea, was prepared by first pasting 20 parts of waxy corn starch in an aqueous solution containing 67.8 parts water. After stirring to 85°C for about fifteen minutes, the paste was cooled to 65°C and there was added 1.80 parts of 24.7° Be solution and 10.0 parts urea. This paste was stirred till uniform and with continued stirring was cooled to room temperature. There were then added the same amounts of defoamer and preservative as used in Example 1. The adhesive product had a pH equal to 9.0 and its viscosity was 73,000 cps, measured under the same conditions as in Example 1. Application of this adhesive in the labeling of the bottles by the same process used in Example 1 showed satisfactory tackiness and machining properties. But when, after three days' storage, the labeled bottles were submitted to a submersion test, they were found to have deficient water resistance in that all the labels were loosened after submersion in water for only 24 hours.

EXAMPLE 3

Two adhesives were prepared following procedures similar to that described in Example 1 and having the following formulations in parts by weight.

|  | A | B |
|---|---|---|
| Waxy corn starch | 25.00 | 25.00 |
| Wheat flour | 0.25 | 0.25 |
| Urea | 10.00 | 10.00 |
| Styrene/maleic anhydride av. molecular wt. 20,000 | 0.00 | 3.90 |
| Aqueous ammonia 26° Be | 1.40 | 1.40 |
| Water | 63.35 | 59.45 |
| Viscosity, cps. | 360,000 | 64,000 |
| pH | 9.2 | 8.9 |

The adhesive A which did not contain the styrene/maleic component of this invention failed the 3-day cold water resistance test whereas all the labels fixed with adhesive B of this invention passed the 3-day test.

EXAMPLE 4

Two adhesives were prepared as in Example 3 but having the following formulations, with water to make 100 parts by weight.

|  | A | B |
|---|---|---|
| Waxy corn starch | 25.00 | 25.00 |
| Wheat flour | 0.50 | 0.50 |
| Urea | 10.00 | 10.00 |
| Styrene/maleic(av.M.W. 10,000 | 3.90 | — |
| anhydride (av.M.W. 50,000 | — | 3.90 |
| Aq. ammonia 26° Be | 2.00 | 1.40 |
| Viscosity, cps. | 130,800 | 69,000 |
| pH | 8.2 | 8.8 |

All bottles treated with these adhesives passed the 3-day water resistance test.

EXAMPLE 5

Using the procedure of Example 3, three formulations were prepared containing 25.00 parts by weight waxy corn starch, 0.50 parts wheat flour, 10 parts urea and the hydrolyzed product of 3.90 parts of styrene/maleic anhydride having average molecular weight equal to 20,000. However instead of using ammonia there were used respectively 2.40 parts morpholine, 2.80 parts triethanolamine and 1.20 parts 25° Be sodium hydroxide. The viscosities of the resultant products were respectively 110,000, 116,000 and 200,000 cps. The pH of the respective products was 8.4, 8.4 and 8.9. Although these products, which are not illustrative of the instant invention, could be used successfully to fasten labels on bottles, they all failed the 3-day cold water resistance test.

EXAMPLE 6

Examples of other formulations, all of which pass the 3-day submersion test, are summarized in Table I.

TABLE I

| Material | A | B | C | D | E | F | G | H | J |
|---|---|---|---|---|---|---|---|---|---|
| Waxy Corn | 30.00 | 25.00 | 25.00 | 20.00 | 25.00 | 25.00 | 10.00 | — | 20.00 |
| Tapioca Starch | — | — | — | — | — | — | 15.00 | — | — |
| Pearl Corn Starch | — | — | — | — | — | — | — | 25.00 | — |
| Wheat Flour | .50 | .50 | .50 | .50 | .50 | 1.00 | .50 | .50 | — |
| Urea | 10.00 | — | 8.00 | 10.00 | 10.00 | 15.00 | 10.00 | 10.00 | 10.00 |
| Dicyandiamide | — | 10.00 | 3.00 | — | — | — | — | — | — |
| Styrene Maleic Anhydride Avg. Molecular Wt. 20,000 | 4.40 | 3.90 | 3.90 | 5.00 | 3.00 | — | 3.90 | 3.90 | — |
| Styrene Maleic Anhydride Avg. Molecular Wt. 10,000 | — | — | — | — | — | 3.00 | — | — | 5.00 |
| Ammonia Hydroxide 26° Be | 1.40 | 1.40 | 1.40 | 2.00 | 3.00 | 3.00 | 1.40 | 1.40 | 3.00 |
| Water to make up 100 parts Viscosity cps. | 30,000 | 40,000 | 33,000 | 40,000 | 124,000 | 110,000 | 78,000 | 77,000 | 196,000 |
| pH | 8.8 | 8.8 | 8.8 | 9.1 | 9.1 | 8.9 | 9.1 | 9.0 | 9.0 |

EXAMPLE 7

The procedure of Example 1 was followed except that instead of the styrene/maleic anhydride copolymer there was used an equal weight of a copolymer of polyvinylmethyl ether and maleic anhydride of a grade having specific viscosity equal to 3.0 which is in the range of specific viscosity found by Britton (U.S. Pat. No. 3,133,890) to be most advantageous in increasing the water resistance of certain atarch/polyvinyl alcohol adhesives. This adhesive, which is not an illustration of the instant invention, was found to fail in the water submersion test.

It will be understood that it is intended to cover any changes and modifications of the examples of the invention herein chosen for the purpose of illustration which do not constitute departures from the spirit and scope of the invention.

What is claimed is:

1. An adhesive for labeling glass bottles capable of forming a paper-to-glass bond durable to submersion in ice water, said adhesive consisting essentially of at least 40 percent by weight water; from about 10 percent to about 40 percent unconverted starch; from about 5 percent to about 20 percent nitrogenous substance selected from the group consisting of urea, dicyandiamide and mixtures thereof; and an ammoniated hydrolysis product of a styrene/maleic anhydride copolymer devoid of amide groups in amount corresponding to from about 0.6 to about 33 parts by weight of said copolymer for each 100 parts of combined weight of starch and nitrogenous substance, with sufficient ammonia to effect a pH in the adhesive in the range of about 7.5 to about 9.2.

2. In an adhesive for labeling glass bottles capable of forming a paper-to-glass bond durable for at least 3 days to submersion in ice water consisting essentially of at least 40 percent by weight water; from about 10 percent to about 40 percent starch; from about 5 percent to about 20 percent nitrogenous substance selected from the group consisting of urea, dicyandiamide and mixtures thereof; the improvement relating to the inclusion of an ammoniated hydrolysis product of a styrene/maleic anhydride copolymer devoid of amide groups in amount corresponding to from about 0.6 to about 33 parts by weight of styrene/maleic anhydride copolymer for each 100 parts of combined weight of starch and nitrogenous substance, with sufficient ammonia to effect a pH in the adhesive in the range of about 7.5 to about 9.2, said styrene/maleic anhydride copolymer having average molecular weight of 10,000 to 50,000.

3. An adhesive consisting generally of at least 50 percent by weight water; from about 20 percent to about 30 percent unconverted starch; from about 8 percent to about 10 percent of a nitrogenous substance selected from the group consisting of urea, dicyandiamide and mixtures thereof; and an ammoniated hydrolysis product of a styrene/maleic anhydride copolymer devoid of amide groups in amount corresponding to from about 10 to about 20 parts by weight of styrene/maleic anhydride copolymer for each 100 parts of combined weight of starch and nitrogenous substance with sufficient ammonia to effect a pH in the adhesive in the range of about 7.5 to about 9.2.

4. A glass bottle and a paper label attached thereto by means of the adhesive of claim 1.

5. A glass bottle and a paper label attached thereto by means of the adhesive of claim 3 wherein said styrene/maleic anhydride copolymer has an average molecular weight of 10,000 to 50,000.

6. An adhesive of claim 1 wherein said starch is selected from the group consisting of corn, waxy maize, potato, sago, wheat, rice, sweet potato, arrowroot, tapioca and mixtures of said starches.

* * * * *